April 9, 1968  J. D. HAGEN  3,377,052
HAND IMPACT WEDGE MEANS
Filed Nov. 14, 1966
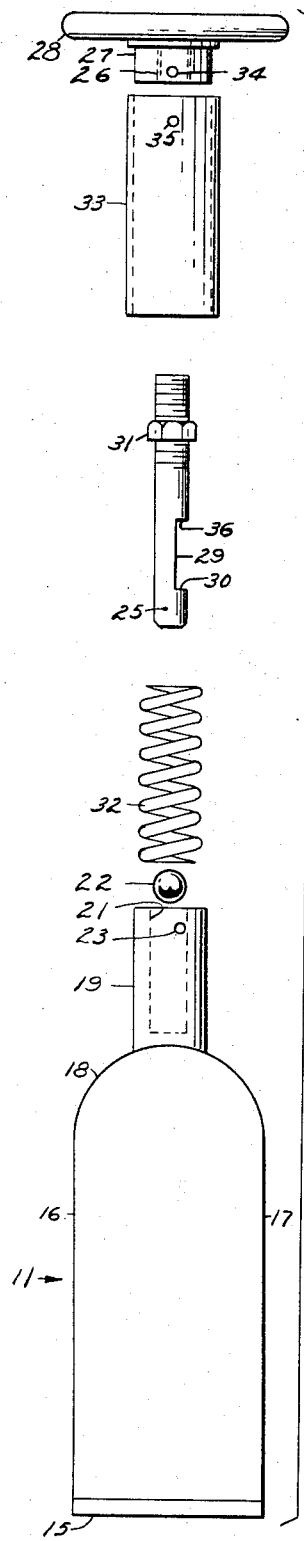
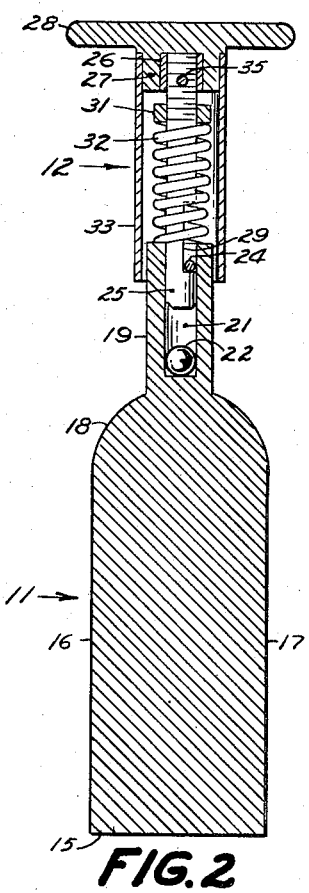
FIG.3  FIG.1  FIG.2
INVENTOR
JACK D. HAGEN
BY
Stanley C. Binish
ATTORNEY

United States Patent Office 3,377,052
Patented Apr. 9, 1968

3,377,052
HAND IMPACT WEDGE MEANS
Jack D. Hagen, Washington Island, Wis. 54246
Filed Nov. 14, 1966, Ser. No. 594,005
7 Claims. (Cl. 254—104)

ABSTRACT OF THE DISCLOSURE

A handy retractile hand-impact wedge means, for use in a saw kerf, having the wedge portion thereof made of a material significantly softer than the teeth of a conventional chain saw, thereby to eliminate damage to said teeth when the chain saw whips up against such wedge.

---

The purpose of this invention is to provide handy sawunbind wedge means for sawyers working in the logging occupation wherein trees are felled and then sawed into suitable log lengths. In such a sawing operation, the saw, whether it be a one or two handed lumberman's saw, or a chain saw, a problem arises of the saw being often pinched or bound in the saw kerf. At the present time, the sawyer relieves such squeezed saw by sledge driving a heavy steel wedge into the top portion of the kerf, above the saw, thereby unpinching or unbinding the saw. However, as the sawyer moves about from tree to tree, plying his trade, the separate wedge and sledge therefor are seldom within reach when needed, and the sawyer must seek for them where last used, sometimes lost, and often separately hidden in the brush or under branches. Consequently, valuable time is lost searching for the wedge and sledge.

To eliminate this annoying search-and-seek-out problem, a combined wedge and retractile hammer means is provided, operable to be repeatedly struck and driven by the hand of the sawyer. The striking force of the bare or gloved hand and the tremendous mechanical advantage of a wedge are sufficient to relieve a saw pinched or bound in even the most massive log. Such wedge being made small and light weight, such as of aluminum, adapts the wedge means for convenient carrying in the sawyer's pocket, thereby making for a most handy pocket tool, as handy as the pocket in the sawyer's pants or jacket, and always within the sawyer's reach and not a burden to have on his person. Also, when the saw operator first notices the kerf starting to close, he can insert and drive the wedge into the kerf, thereby anticipating and preventing the saw being pinched or bound in the kerf.

Furthermore, the present day cutter chain of a chain saw tends to whip and fly upwardly from its bar support. In doing so, it often strikes the presently used steel wedge previously driven into the kerf to avoid or relieve pinching or binding of the saw. The striking of the steel wedge by the rapidly moving teeth of the cutter chain obviously dulls such teeth, requiring an extensive sharpening operation to restore the saw to a good operating condition. Sometimes the teeth are damaged beyond repair and consequently the cutter chain is discarded as a whole.

This problem is eliminated by making the wedge of a material that will not injure the saw teeth, when and if it is struck by said saw teeth, such as of wood, plastic, fibre glass, soft or ductile metal, or the like. The soft or ductile metals include the non-ferrous metals such as aluminum, copper, tin, etc., or the alloys thereof suitabe for the purpose intended.

An object of the present invention is the provision of a retractile hand-impact wedge means.

Another object is to provide a handy hand-impact wedge means adapted to be carried on one's person.

Still another object of the invention is the provision of a hand-impact wedge means that is sufficiently small and lightweight adapted to be carried on one's person.

Yet another object is to provide a retractile hand-impact wedge means wherein the wedge thereof is made of a material softer than the material comprising the teeth of a chain saw, so as not to significantly damage the teeth of such chain saw when such teeth strike said wedge.

A further object of the invention is the provision of a hand-impact wedge means wherein the wedge thereof is made of soft or ductile metal.

Still a further object is the provision of a hand-impact wedge means wherein all the parts are interconnected at all times thereby avoiding loss of the separate parts thereof.

Other specific objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a side elevation view of the invention;

FIG. 2 is a section view taken on line 2—2 of FIG. 1; and

FIG. 3 is an exploded view of the invention.

Referring now to the drawings, wherein like reference characters designate like or corresponding parts throughout the several views, there is shown a retractile hand-impact wedge device generally indicated at 10 comprising an aluminum wedge element generally indicated at 11 and a retractile hammer means generally indicated at 12.

The wedge 11 comprises tapering rectangular faces 13 and 14 terminating in a lower edge 15. The sides 16 and 17 are triangular and parallel. The top end or base is rounded as at 18 and provided with a centrally disposed and axially projecting cylindrical neck 19. Said neck is axially bored as at 21 to receive a steel ball bearing 22 at the bottom thereof. Said ball bearing functions as a safe guard, by presenting a rounded surface between the bottom of bore 21 and a plunger 25, to be hereinafter described, for the purpose of preventing the plunger becoming stuck or seized in the bore due to expansion of the plunger resulting from its repeated impact against the bottom of bore 21.

The upper end of said hollow neck 19 is provided with a lateral bore 23 to receive stop pin 24 therethrough, see FIGS. 3 and 2, respectively.

The retractile hammer means 12 comprises a plunger 25 reciprocable in said guide bore 21 and extending therefrom.

The upper end of said plunger 25 is threadedly engaged in a bushing 26 centrally embedded in the depending lug 27 of a hard rubber button head 28.

Intermediate the ends of said plunger is provided a wide transverse slot 29 to receive stop pin 24 therein.

The upper end of plunger 25, being threaded, is provided with an adjusting nut 31 thereon.

A helical compression spring 32, disposed around plunger 25, is seated on the upper end of neck 19 and shouldered against adjusting nut 31, thereby normally urging and biasing the lower side wall 30 of plunger slot 29 against stop pin 24.

The slot 29 is sufficiently wide to allow the plunger to travel to, and contact, the ball bearing 22, with a margin of clearance between the upper side wall 36 of the slot and the stop pin 24.

A skirt or sleeve 33 surrounding and depending from lug 27, extends to and overlaps the top end portion of neck 19 when the plunger 25 is normally retracted. Said sleeve 33 functions as a guard to prevent the entry of foreign matter into or unto the enclosed relatively movable operative parts. The sleeve is of a length to provide a clearance between the lower end of said sleeve and the base end of said wedge when said plunger 25 is in its lower or contact position with said sphere 22.

A diametral bore 34 through said sleeve 33, depending lug 27, bushing 26 and plunger 25, receives pin 35, to fix said parts in assembled relation.

*Operation.*—In the event a saw becomes pinched, or is about to become pinched, in a kerf, the wedge edge 15 is disposed in the kerf, above the saw, and the button head 28 is struck with a forceful blow by the hand of the sawyer. As the hand strikes the head 28 the plunger 25 is thrust downwardly, against the tension of spring 32, until it bottoms or impinges against ball bearing 22 which transmits the force to the bottom of guide bore 21 and thus to wedge 11, thereby driving the wedge into the kerf. As the striking hand is removed from the button head 28, the plunger is retracted, being urged upwardly by compression spring 32, until it abuts stop pin 24 and is thereby stopped in its normal retracted position. Repeated blows are delivered to the button head, if necessary, until the wedge is driven sufficiently deep into the kerf to spread or widen the kerf, thereby to unpinch or unbind the saw. Obviously, the sphere 22 can be omitted, in which event the lower end of the plunger 25 should be lengthened a distance equal to the diameter of the ball, thereby allowing the bottom of the plunger to strike the bottom of guide bore 21, directly. In the alternative, the slot 29 can be widened, that is the upper wall 36 of the slot can be displaced upwardly to compensate for the absence of the sphere 22.

While an aluminum wedge is preferred, the invention is not limited thereto. Broadly, the wedge can be made of any suitable wedge material including wood, plastic, fibre glass and metal, and the like. In the field of metals suitable relatively soft ductile non-ferrous metals are preferred, such as aluminum, copper, tin, zinc, and the like, and the suitable soft alloys thereof, because such soft ductile metals do not dull or materially injure the relatively hard saw chain teeth, when said teeth inadvertently impinge against such relatively soft metals. Quite obviously, should a steel wedge or the like be used, the chain saw teeth would be damaged considerably should the saw chain be whipped upwardly against such driven steel wedge. However a steel wedge can be used if desired.

Some characteristic features of this invention are the provision of a retractile hand-impact wedge means; a retractile hand-impact wedge means having a soft ductile metal wedge; a retractile hand-impact wedge means of pocket size and having an aluminum wedge element; and a retractile hand-impact wedge means having all the parts interconnected at all times thereby avoiding loss of the separate parts thereof.

Obviously many modifications and variations of the present invention are possible in the light of the above teachings. It is therefore to be understood, that within the scope of the appended claims, the invention may be practiced otherwise than as specifically described.

What is claimed and desired to be protected by Letters Patent of the United States is:

1. A retractile hand-impact wedge means, comprising: a wedge having an axial guide bore means at the base end portion thereof; a plunger received in and extending from said guide bore means; a head on the outer end of said plunger; a slot in said plunger, said slot having a lower side wall and an upper side wall; compression spring means for urging said plunger outwardly of said guide bore; and stop means at said guide bore means and extending into said slot, said spring means being initially tensioned to urge the lower side wall of said slot against said stop means thereby to retract said plunger to its normal upper position, and the upper side wall of said slot being spaced from the lower side wall of said slot a distance to provide a clearance between the upper side wall of said slot and said stop means when the lower end of said plunger becomes bottomed in said guide bore means.

2. The device of claim 1 wherein the wedge is made of a material selected from the class consisting of wood, plastic, fibre glass, aluminum and ductile metals.

3. A retractile hand-impact wedge means, comprising: a wedge having a neck-extending axially from the base end of said wedge, said neck being axially bored; a sphere on the bottom of said bore; a plunger reciprocable in and extending from said axial neck bore, said plunger having a slot at the bottom end portion of said plunger, and said slot having an upper side wall and a lower side wall; a lateral bore through said neck at said slot; a stop pin in said lateral bore and slot; a head on the upper end of said plunger; abutment means on the outer end of said plunger; and compression spring means seated on said neck and shouldered against said abutment means; said spring being initially tensioned to urge the lower side wall of said slot against said stop pin thereby to retract said plunger to its normal upper position; and the upper side wall of said slot being spaced from the lower side wall of said slot a distance to provide a clearance between the upper side wall of said slot and said stop pin when the lower end of said plunger is in contact with said sphere.

4. The device of claim 3 and a guard sleeve depending from said head and telescopically surrounding the upper end portion of said neck in overlapped relation when said plunger is in its normal upper position, said guard sleeve being of a length to provide a clearance between the lower end of said sleeve and the base end of said wedge when said plunger is in its lower contact position with said sphere.

5. The device of claim 3 wherein the abutment means is movably adjustable axially along said plunger.

6. The device of claim 3 wherein the wedge is made of aluminum.

7. The device of claim 3 wherein the wedge is made of material selected from the class consisting of wood, plastic, fibre glass, and ductile metal.

References Cited

UNITED STATES PATENTS

| 161,282 | 3/1875 | Russell | 30—277 X |
| 776,191 | 11/1904 | Lynch | 30—277 X |
| 2,903,932 | 9/1959 | McGonagill | 173—126 X |
| 3,185,442 | 5/1965 | Hemphill | 254—104 |
| 3,222,766 | 12/1965 | Camargo | 81—52.35 X |

FOREIGN PATENTS

| 550,170 | 12/1957 | Canada. |
| 828,788 | 1/1952 | Germany. |

OTHELL M. SIMPSON, *Primary Examiner.*